Figure 1:
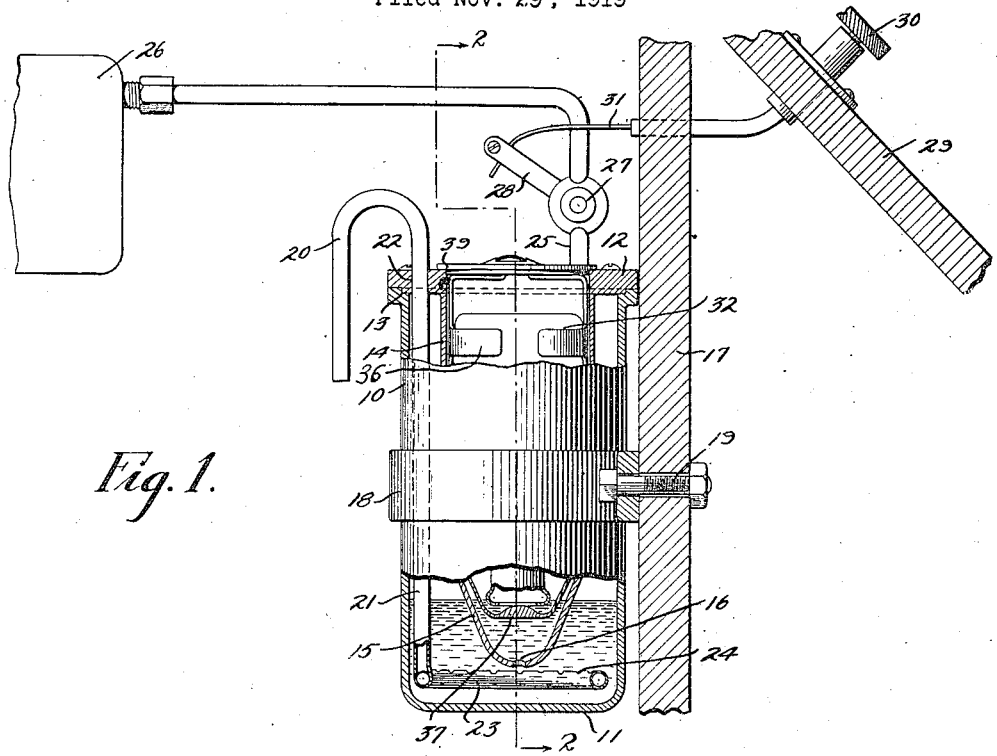

March 4, 1924.

E. I. EMERSON

COMBUSTION PROMOTER

Filed Nov. 29, 1919

1,485,497

WITNESSES
Fred Frederick
L. A. Paley

INVENTOR
ELMER I. EMERSON.
BY Munn Co
ATTORNEYS

Patented Mar. 4, 1924.

1,485,497

UNITED STATES PATENT OFFICE.

ELMER ISAIAH EMERSON, OF MIDDLETOWN, NEW YORK.

COMBUSTION PROMOTER.

Application filed November 29, 1919. Serial No. 341,553.

*To all whom it may concern:*

Be it known that I, ELMER I. EMERSON, a citizen of the United States, and a resident of Middletown, county of Orange, and State of New York, have invented a new and Improved Combustion Promoter, of which the following is a full, clear, and exact description.

This invention relates to a combustion promoter and has reference more particularly to a device for the promotion of combustion in internal combustion engines adapted to introduce an oxidizing agent in the cylinders of said engines preferably along with the explosive mixture of fuel oil, vapor and air.

In an ordinary internal combustion engine, the combustion of the vapor air mixture is not usually complete and as a result carbon deposits on the walls of the cylinders and on the spark plugs, so that after continued operation, said carbon frequently gets red hot and causes preignition in the engine and a knocking therein as a result. Furthermore the carbon deposit on the spark plug terminals may short circuit said spark plugs, so that the ignition in the cylinder is interrupted and misfires or total inaction of the cylinder results. This carbon must be cleaned from the cylinder and spark plugs periodically in order to insure a proper and efficient operation of the engine.

Many attempts have been made to remove this carbon by chemicals or other means without dismantling the engine, but often the process was expensive or was harmful to the walls of the cylinder. One of these processes burns out the deposited carbon in the cylinders by the use of oxygen. Other processes inject water vapor into the cylinder along with the explosive mixture, said water vapor combining with the carbon deposited in the cylinder at the high temperature to form water gas according to the following reaction:

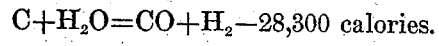

$$C + H_2O = CO + H_2 - 28,300 \text{ calories.}$$

It is seen from the above reaction that the carbon will be removed but the reaction is endothermal and heat is abstracted from the explosive mixture so that the temperature is lowered to a point where less perfect combustion takes place.

In order to provide a more perfect means for removing deposited carbon from the cylinders of an internal combustion engine, and to prevent its deposition, I introduce hydrogen peroxide or a mixture of hydrogen peroxide and water vapor into the cylinders preferably along with the explosive mixture of the gas.

Hydrogen peroxide, which is commonly bought on the market, is a water solution containing about 3% of hydrogen peroxide together with a small amount of some chemical which is used as a preservative to prevent the decomposition of the hydrogen peroxide into water and oxygen. When hydrogen peroxide is heated to a temperature of 100° C., it decomposes violently into water and oxygen, according to the following reaction:

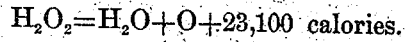

$$H_2O_2 = H_2O + O + 23,100 \text{ calories.}$$

Hydrogen peroxide is a much more active oxidizing agent than is free oxygen. This would be expected from the fact that it contains so much more thermal energy than the water and oxygen into which it decomposes. The oxygen liberated from the hydrogen peroxide will combine with any carbon deposited in the cylinders with an evolution of heat according to the following reaction:

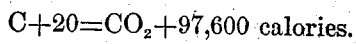

$$C + 2O = CO_2 + 97,600 \text{ calories.}$$

It will be further seen that while the injection of water vapor into the combustion chamber of a cylinder in an internal combustion engine reduces the temperature of the explosive mixture by its interaction with carbon, the admission of hydrogen peroxide will increase the temperature of the explosive mixture, thus insuring a more perfect combustion, so that little if any carbon will be deposited due to imperfect combustion. However, owing to the fact that hydrogen peroxide is such an active oxidizing agent, the deposition of carbon will be impossible in the presence of hydrogen peroxide due to the strong oxidizing conditions existing in the engine cylinders.

Reference is to be had to the accompanying drawing forming a part of this specification, in which it is understood that the drawing is merely illustrative of one example of an apparatus which could be used for injecting hydrogen peroxide or a mixture of hydrogen peroxide and water vapor into the cylinders of an internal combustion engine, and in which:—

Figure 2:
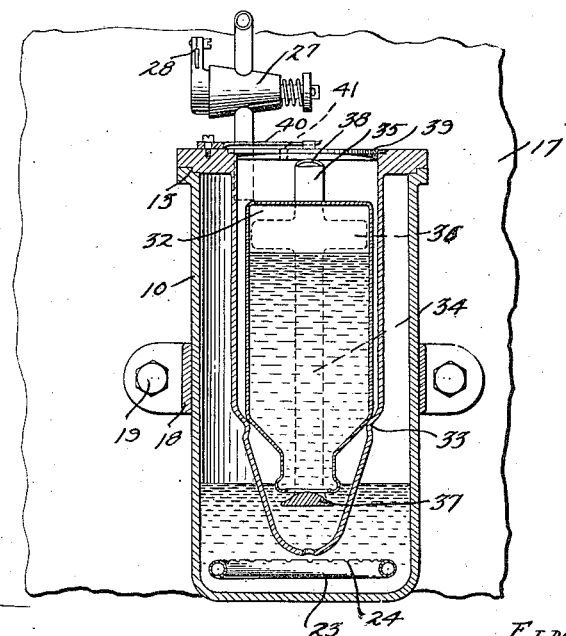

Figure 1 is an elevation of the improved combustion promoter with parts broken away to disclose the inner construction; and Figure 2 is a section through Figure 1 on the line 2—2.

Referring to the accompanying drawing by numerals, 10 indicates the side walls of a container which may be of any suitable shape or material, said side walls being preferably cylindrical. The container is provided with a bottom 11 and a removable cover 12, which is provided with an offset shoulder 13 engaging a similar groove in the container wall 10, said shoulder serving to insure the mounting of the cover coaxially with the container. Fixed coaxially to the cover 12, is a cylindrical member 14 which extends downwardly into the container and is provided adjacent its lower end with a conically shaped portion 15, terminating in one or more holes 16 whose purpose will be hereinafter described. The container is fastened to any suitable support 17 by means of one or more bands 18 encircling said container, and fixed to said support by means of bolts 19. A U-shaped tube 20 has an arm 21 which passes through and is tightly fitted in a hole 22 in the cover 12. The arm 21 is bent at right angles somewhat above the bottom 11 of the container and is then formed into a circular member 23 which is provided with a plurality of perforations 24 along its upper side. A tube 25 is also fitted to the cover 12 and extends therethrough, said tube being connected at the end opposite the cover to either a fuel manifold or a cylinder 26. Between the cover 12 and the fuel manifold 26, the tube 25 is provided with a valve 27 of any suitable construction, which is controlled by a lever 28 operated from a convenient point on the dash-board 29 by an operating member 30 connected by a link 31 to the lever 28. The cylinder 14 is of such size as to accommodate a bottle 32 of hydrogen peroxide such as those ordinarily purchased on the market, so that said bottle may be inserted into said cylinder and will rest on an annular shoulder 33 formed on the inside of said cylinder. In order to conveniently insert in and remove said bottle from said cylinder, a holder 34 of any suitable construction is provided which will grip said bottle. The holder 34 has preferably a pair of members 35 extending longitudinally of the bottle, said members including laterally extending arms 36 which partly encircle said bottle and hold it securely. The two members 35 are connected by a bottom support 37 on which the neck of the bottle rests, and are bent inwardly at the top to form a handle 38, by which the bottle can be removed and inserted in said cylinder. The cylinder 14 is closed at the top by a cover 39 held in place by any suitable spring clip 40. A small hole 41 in the cover 39 permits air to enter the cylinder 14 to replace the liquid carried away to the cylinders.

In operation the holder 34 is placed on the bottle 32 of hydrogen peroxide after the cork in said bottle is removed. The bottle and holder are then lowered into the cylinder 14 so that said bottle rests upon the shoulder 33 with its mouth somewhat above the hole 16. The hydrogen peroxide will then run out until an equilibrium is reached substantially as shown in Figure 2. A partial vacuum is created in the fuel manifold or cylinder 26 by the operation of the engine and as a result air is sucked into the tube 20 and through the perforations 24 so that said air bubbles up through the solution of hydrogen peroxide and finally finds its way through the tube 25 into the cylinders of the engine. The quantity of air and therefore hydrogen peroxide admitted to the cylinders of the engine is controlled from the dash board by means of the operating member 30 acting on the valve lever 28. When the air bubbles through the solution of hydrogen peroxide it becomes saturated with and entrains some of the hydrogen peroxide and also water vapor, which is injected through the pipe 25 into the cylinders of the engine. The hydrogen peroxide at once violently decomposes at the temperature of the cylinder giving off a large quantity of heat to the explosive mixture which raises the pressure in said cylinder and also raises its temperature so that a more perfect combustion is obtained.

The carbon which might be deposited during the combustion is acted upon by three factors, viz: the increased heat causing more perfect combustion, the action of the water vapor on the free carbon tending to transform it into carbon monoxide and hydrogen according to the aforementioned reaction, and thirdly and most important the strongly reducing action of the oxygen generated from the hydrogen peroxide which tends to combine with the carbon liberated during the combustion, transforming it into carbon dioxide with big evolution of heat according to the aforementioned reaction.

I have found that by the use of this device, a cheaper grade of fuel may be used such as kerosene etc., since troubles resulting from deposited carbon are entirely eliminated as the hydrogen peroxide is a powerful oxidizing agent which greatly aids in the combustion of said fuel. Furthermore, I have proved by the following experiments on an automobile engine that the aforementioned theoretical considerations are correct and that more power and more mileage per gallon of fuel is obtained by injecting hydrogen peroxide into the cylinders of said engine:—

(a) When the motor is running idle at a low speed with the valve 27 closed, an opening of said valve so that the hydrogen peroxide is admitted to the cylinders, at once accelerates the speed of the engine showing that a more perfect combustion obtains and that more power is generated due to the heat added to the cylinders by the decomposition of the hydrogen peroxide and its subsequent interaction with free carbon.

(b) When the automobile is running on the level at a constant speed with the valve 27 open, a closing of said valve so that the supply of hydrogen peroxide to the cylinders is cut off, causes the speed of said automobile to considerably diminish.

While I prefer to use hydrogen peroxide in my apparatus, any other suitable oxidizing agent may be used.

I would state in conclusion that while the illustrated example constitutes a practical embodiment of my invention, I do not limit myself strictly to the mechanical details herein illustrated since manifestly the same may be considerably varied in any suitable apparatus for accomplishing the aforementioned result without departure from the spirit of the invention, as defined in the appended claim.

Having thus described my invention, I claim as new and desire to secure by Letters Patent:

The method of reducing carbon formations in the cylinders of internal combustion motors, which consists in introducing air into the cylinders of the motor cylinders with the introduction of the charge of fuel, said air having been first passed through a volume of hydrogen peroxide sufficient to saturate the air therewith.

ELMER ISAIAH EMERSON.